3,162,630
21-FLUORO-17-METHYL-11-OXYGENATED
STEROIDS
Peter F. Morand and David J. Marshall, Montreal,
Quebec, and Romano Deghenghi, Westmount, Quebec,
Canada, assignors to American Home Products Corporation, New York, N.Y., a corporation of Delaware
No Drawing. Filed June 11, 1963, Ser. No. 286,920
6 Claims. (Cl. 260—239.55)

This invention relates to certain novel, physiologically-active steroids and to the procedures by which said steroids are prepared. It is also directed to certain novel intermediate compounds secured during the process of preparing said physiologically-active steroids.

The compounds of this invention are physiologically active substances which possess anti-inflammatory activity greatly dissociated from thymolytic, catabolic and other metabolic activities, including influences upon the mineral balance. Hence they can be advantageously used in lieu of known corticoids such as hydrocortisone and cortisone in the treatment of rheumatoid arthritis, and in the treatment of dermatoses; for these purposes they can be administered topically or systemically in the same manner as hydrocortisone. The dosage, in each instance, may be adjusted in accordance with the relative potency of the steroid.

The steroids of this invention are 21-fluoro derivatives of 11-oxygenated 17α-methylpregnanes. More particularly, the steroids of this invention have the general formula—

I.

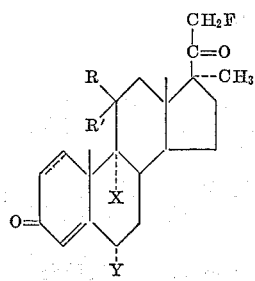

wherein the 1,2 position is saturated or double bonded; R is hydrogen, R' is β-hydroxy or together R and R' is keto; X is hydrogen, or halogen (i.e. fluoro, chloro, bromo or iodo); Y is halogen (preferably fluoro) or hydrogen or methyl. Particularly preferred are those compounds wherein the 1,2 position is double bonded, R is hydrogen and R' is β-hydroxy, X is halogen (optimally fluoro), Y is hydrogen, fluoro or methyl.

Suitable starting materials are compounds of the general Formula II—

II.

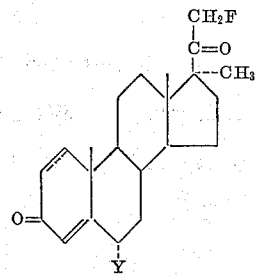

wherein the 1,2 position is saturated or double bonded; Y is hydrogen, halogen or methyl, described in the U.S. application of R. Deghenghi, Serial No. 119,292, filed June 26, 1961, now U.S. Patent No. 3,093,663, granted June 11, 1963.

Suitable intermediates for the compounds of Formula I are steroids of the general Formula III—

III.

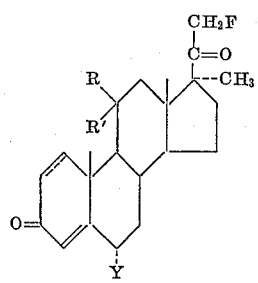

wherein the 1,2 position is saturated or double bonded; and Y is hydrogen, halogen or methyl, R is hydrogen and R' is hydroxy (α or β). The compounds of Formula III are prepared by microbiological hydroxylation of the starting materials (Formula II) by subjecting the latter to the oxygenating action of a microorganism such as *Aspergillus ochraceus*.

More specifically, the compounds of this invention may be prepared by the following sequence of reactions:

A pregnene derivative of Formula III in which Y represents hydrogen, halogen, or methyl, R represents hydrogen, and R' an α-hydroxyl group, and in which the double bond $\Delta^{1,2}$ may or may not be present, is treated with methane sulfonyl chloride to obtain the corresponding 11α-mesylate. The latter ester, upon treatment with suitable basic reagent such as collidine, dimethylformamide, or preferably anhydrous sodium acetate, readily loses the elements of methanesulfonic acid to yield the corresponding $\Delta^{9,(11)}$-unsaturated compound, which may be a diene or a triene depending upon the number of double bonds present in the starting material. The elements of hyprobromous acid are then added across the double bond $\Delta^{9,(11)}$ of the last-named compound, preferably by treatment with N-bromosuccinimide and an acid such as, e.g., perchloric acid, to obtain the corresponding 9α-bromo-11β-hydroxy-pregnene or -pregnadiene derivative. The elements of hydrogen bromide are then eliminated from the steroidal bromohydrin thus obtained, preferably by treatment with potassium acetate, to yield the corresponding 9β,11β-oxido-pregnene or -pregnadiene derivative, and the oxido bridge of the latter compound is opened, preferably with anhydrous hydrogen fluoride, to obtain the corresponding 9α-fluoro-11β-hydroxy-pregnene or -pregnadiene derivative. Finally, the 11β-hydroxy group of the latter compound may be oxidized by conventional means, preferably by means of chromic acid or of N-bromosuccinimide, to the corresponding ketone, to yield the corresponding pregnene- or pregnadiene-3,11,20-trione.

This sequence of reactions may be indicated schematically as follows:

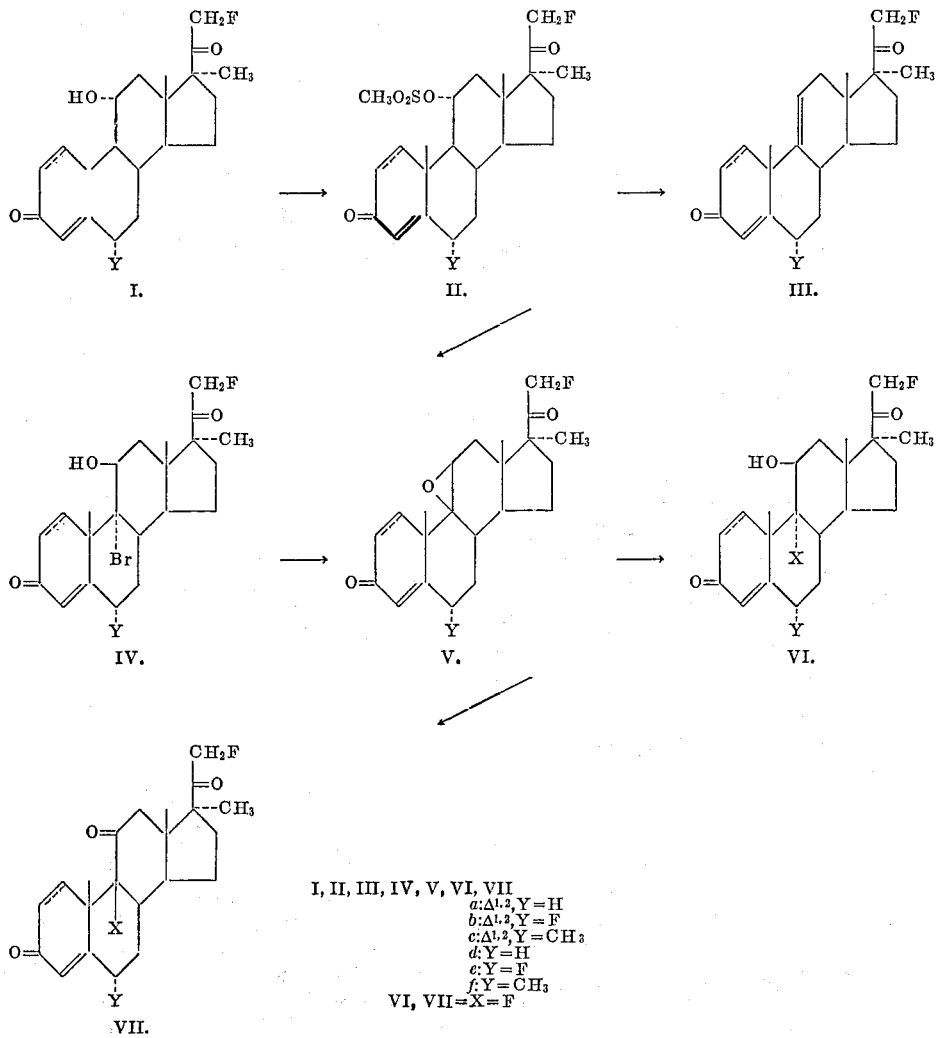

The following examples illustrate our invention.

Example 1

To a solution of 11α-hydroxy-17α-methyl-21-fluoropregna-1,4-diene-3,20-dione (1.945 g.) in anhydrous pyridine (20 ml.) there was added methane sulfonyl chloride (1.0 ml.). The reaction solution was left at room temperature overnight and then carefully diluted with ice water. An oil separated which subsequently crystallized on standing. This solid, 11α-mesyloxy-17α-methyl-21-fluoropregna-1,4-diene-3,20-dione (IIa), was collected by filtration. It had the melting point 112–118° C. (dec.). Two crystallizations from aqueous methanol gave fluffy needles; melting point 120–123° C. (dec.).

This procedure was used to prepare the following compounds:

6α,21-difluoro - 11α - mesyloxy-17α-methylpregna-1,4-diene-3,20-dione (IIb).

6α,17α-dimethyl-11α-mesyloxy - 21-fluoropregna-1,4-diene-3,20-dione (IIc).

11α-mesyloxy-17α-methyl-21 - fluoropregn-4-ene-3,20-dione (IId).

6α,21-difluoro-11α-mesyloxy - 17α - methylpregn-4-ene-3,20-dione (IIe)

6α,17α-dimethyl-11α-mesyloxy-21-fluoropregna - 4-ene-3,20-dione (IIf).

Example 2

Anhydrous sodium acetate (1.595 g.) was added to a solution of the product from Example 1 (1.137 g.) in acetic acid (18 ml.) and this mixture was refluxed for half an hour. The reaction solution was cooled, diluted with water, and extracted with methylene chloride. The combined extracts were washed with sodium bicarbonate solution and water, and then dried.

Evaporation of the solvent gave a glass which was purified by chromatography over alumina. Elution with benzene-petroleum ether (3:1) and benzene gave crystalline material of melting point 137–145° C. Several recrystallizations from acetone-hexane gave an analytical sample of 17α-methyl-21-fluoropregna-1,4,9(11)-triene-3,20-dione (IIIa) with a melting point of 172–173° C.;

$[\alpha]_D - 60.9°$; $\lambda_{max.}$ 239 mμ, $\epsilon$ 14100; $\nu_{max.}^{CHCl_3}$ 1725, 1665 cm.$^{-1}$ Analysis confirmed the empiric formula $C_{22}H_{27}FO_2$ (342.44) for 17α-methyl-21-fluoropregna-1,4,9(11)-triene-3,20-dione. Required: C, 77.19; H, 7.95; F, 5.55. Found: C, 76.97; H, 7.58; F, 5.80.

The following compounds were prepared by the above procedure:

6α,21-difluoro - 17α - methylpregna-1,4,9(11)-triene-3,20-dione (IIIb).

6α,17α-dimethyl - 21-fluoropregna-1,4,9(11)-triene-3,20-dione (IIIc).

17α-methyl - 21-fluoropregna-4,9(11)-diene-3,20-dione (IIId).

6α,21-difluoro - 17α-methylpregna-4,9(11)-diene-3,20-dione (IIIe).

6α,17α-dimethyl-21-fluoropregna-4,9(11) - diene-3,20-dione (IIIf).

Example 3

To a stirred solution of 17α-methyl-21-fluoropregna-1,4,9(11)-triene-3,20-dione (4.4 g.) in dioxane (44 ml.) and water (2.64 ml.) there were added N-bromosuccinimide (3.0 g.) and a solution of perchloric acid (0.88 ml.) in water (4.4 ml.). The reaction mixture was stirred at room temperature. After two minutes a solid began to precipitate. Stirring was continued for 40 minutes and the solution then diluted with water. The crude product had melting point of 184° C. (dec.). It darkened at 120° C. An analytical sample obtained by crystallization from acetonitrile had a melting point of 179–181° C. (dec.; darkened at 165° C.); $[α]_D+135.6°$ (pyridine); $λ_{max.}$ 242mμ, ε 11800;

$ν_{max.}^{mull.}$ 3480, 1706, 1662 cm.$^{-1}$.

Analysis confirmed the empiric formula $C_{22}H_{28}BrFO_3$ (439.36) for 9α-bromo-11β-hydroxy-17α-methyl-21-fluoropregna-1,4-diene-3,20-dione (IVa). Required: C, 60.13; H, 6.42; Br, 18.19; F, 4.32. Found: C, 60.23; H, 6.45; Br, 18.20, 18.27; F, 4.25, 4.24.

This procedure was used to prepare the following compounds:

6α,21-difluoro - 9α-bromo - 11β - hydroxy-17α-methylpregna-1,4-diene-3,20-dione (IVb).

6α,17α-dimethyl-9α-bromo - 11β - hydroxy-21-fluoropregna-1,4-diene-3,20-dione (IVc).

9α-bromo-11β-hydroxy-17α - methyl-21-fluoropregn-4-ene-3,20-dione (IVd).

6a, 21-difluoro-9a-bromo-11β-hydroxy - 17a-methylpregn-4-ene-3,20-dione (IVe).

6α,17α-dimethyl - 9α-bromo-11β-hydroxy - 21-fluoropregn-4-ene-3,20-dione (IVf).

Example 4

Bromohydrin from Example 3 (2.775 g.) was partially dissolved in dioxane (135 ml.) containing absolute ethanol (75 ml.) and freshly fused potassium acetate (2.2 g.) was added to the mixture. This was refluxed for three hours, cooled and diluted with water. A gummy material (1.92 g.) was collected by filtration. Trituration with methylene chloride gave a soluble fraction (1.442 g.) and an insoluble fraction (0.561 g.).

The latter fraction was identified as starting material. Purification of the methylene chloride-soluble fraction over alumina gave the 9β,11β-oxide on elution with benzene-petroleum ether (4:1), benzene and benzene-ether (4:1). One crystallization from acetone-hexane gave material with a melting point of 162–164° C. which was the compound 9β,11β-oxido-17α-methyl-21-fluoropregna-1,4-diene-3,20-dione (Va).

The following compounds were prepared by the above procedure:

6α,21-difluoro-9β,11β-oxido - 17α - methylpregna - 1,4-diene-3,20-dione (Vb).

6α,17α-dimethyl-9β,11β-oxido - 21 - fluoropregna - 1,4-diene-3,20-dione (Vc).

9β,11β-oxido-17α-methyl - 21 - fluoropregn-4-ene-3,20-dione (Vd).

6α,21-difluoro-9β,11β-oxido - 17α - methylpregn - 4-ene-3,20-dione (Ve).

6α,17α-dimethyl-9β,11β-oxido - 21 - fluoropregn-4-ene-3,20-dione (Vf).

Example 5

Hydrogen fluoride (about 750 mg.) was condensed in a polyethylene bottle immersed in a Dry Ice-acetone bath and to this were added tetrahydrofuran (3.0 ml.) and chloroform (2.0 ml.) followed by a solution of the 9β,11β-oxide (657 mg.) from Example 4 in chloroform (5.0 ml.). The bottle containing the reaction solution was then placed in a salt-ice bath for two hours whereupon the solution turned purple.

After pouring into a 15 percent sodium carbonate solution (50 ml.) containing chloroform (5 ml.), the layers were separated and the aqueous layer was extracted with methylene chloride. The combined extracts were washed to neutrality, dried, and evaporated to dryness. A brown syrup was isolated which crystallized from ethyl acetate to give a first crop of product; of melting point 250–253° C. (dec.). Using acetone-hexane, an analytically pure sample of 9α,21-difluoro-11β-hydroxy-17α-methylpregna-1,4-diene-3,20-dione was obtained; and had a melting point of 261–263° C. (dec.);

$[α]_D+31.1°$ (dioxane); $λ_{max.}$ 240 mμ, ε 14,790;

$ν_{max.}^{mull.}$ 3490, 1708, 1664 cm.$^{-1}$.

Analysis confirmed the empiric formula $C_{22}H_{28}F_2O_3$ (378.44) for 9α,-21-difluoro-11β - hydroxy - 17α - methylpregna-1,4-diene-3,20-dione (VIa). Required: C, 69.82; H, 7.46; F, 10.04. Found: C, 69.65; H, 7.32; F, 9.91, 9.81.

This procedure was used to prepare the following compounds:

6α,9α-21-trifluoro-11β-hydroxy - 17α-methylpregna-1,4-diene-3,20-dione (VIb).

6α,17α-dimethyl-9α,21-difluoro-11β-hydroxypregna-1,4-diene-3,20-dione (VIc).

9α,21-difluoro-11β-hydroxy - 17α - methylpregna-4-ene-3,20-dione (VId).

6α,9α,21-trifluoro-11β-hydroxy-17α-methylpregn-4-ene-3,20-dione (VIe).

6α,17α-dimethyl-9α,21-difluoro - 11β - hydroxypregn-4-ene-3,20-dione (VIf).

Example 6

Oxidation of 9α,21-difluoro-11β-hydroxy-17α-methylpregna-1,4-diene-3,20-dione with chromic acid or N-bromoacetamide in acetone gave the corresponding 11-keto derivative, 9α,21 - difluoro - 17α - methylpregna-1,4-diene-3,11,20-trione (VIIIa).

The following compounds were prepared by the above procedure:

6α,9α,21-trifluoro - 17α-methylpregna-1,4-diene-3,11,20-trione (VIIb).

6α,17α-dimethyl-9α,21-difluoropregna-1,4-diene-3,11,20-trione (VIIc).

9α,21-difluoro-17α-methylpregn - 4 - ene - 3,11,20-trione (VIId).

6α,9α,21-trifluoro-17α-methylpregn-4-ene-3,11,20-trione (VIIe).

6α,17α - dimethyl - 9α,21 - difluoropregn-4-ene-3,11,20-trione (VIIf).

We claim:

1. 9α,21-difluoro-11β-hydroxy - 17α-methylpregna-1,4-diene-3,20-dione.
2. 9α,21-difluoro-17α-methylpregna - 1,4-diene-3,11,20-trione.
3. 11α-mesyloxy-17α-methyl-21-fluoropregna-1,4-diene-3,20-dione.
4. 17α-methyl-21-fluoropregna - 1,4,9(11)-triene-3,20-dione.
5. 9α-bromo-11β-hydroxy-17α-methyl-21-fluoropregna-1,4-diene-3,20-dione.
6. 9β,11β-oxido-17α-methyl - 21-fluoropregna-1,4-diene-3,20-dione.

References Cited in the file of this patent

UNITED STATES PATENTS 2,852,511 Fried _____ Sept. 16, 1958

OTHER REFERENCES

J.A.C.S., vol. 78, June 1956, p. 2658.

Deghenghi et al. "Tetrahedron," February 1963, vol. 19, pp. 289–298.

UNITED STATES PATENT OFFICE
CERTIFICATE OF CORRECTION

Patent No. 3,162,630                                December 22, 1964

Peter F. Morand et al.

It is hereby certified that error appears in the above numbered patent requiring correction and that the said Letters Patent should read as corrected below.

Column 3, first formula at the left of the column, for that portion of the formula reading:

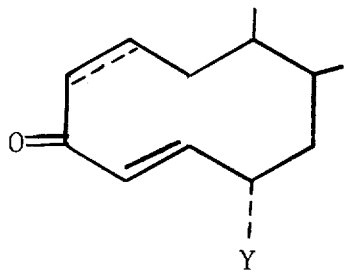 read 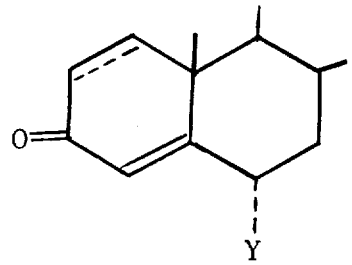

same column 3, line 70, for "-fluoropregna-" read -- -fluoropregn- --.

Signed and sealed this 3rd day of August 1965.

(SEAL)
Attest:

ERNEST W. SWIDER                               EDWARD J. BRENNER
Attesting Officer                             Commissioner of Patents